(12) United States Patent
Shah

(10) Patent No.: US 7,133,929 B1
(45) Date of Patent: Nov. 7, 2006

(54) SYSTEM AND METHOD FOR PROVIDING DETAILED PATH INFORMATION TO CLIENTS

(75) Inventor: Rajesh Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 09/694,492

(22) Filed: Oct. 24, 2000

(51) Int. Cl.
G06F 15/173 (2006.01)

(52) U.S. Cl. .................................. 709/241; 710/316
(58) Field of Classification Search ........ 709/238–244; 370/254–256
See application file for complete search history.

(56) References Cited

U.S. PATENT DOCUMENTS

| | | | | |
|---|---|---|---|---|
| 5,170,393 A | * | 12/1992 | Peterson et al. | 370/255 |
| 5,471,467 A | * | 11/1995 | Johann | 370/238 |
| 5,495,471 A | * | 2/1996 | Chow et al. | 370/221 |
| 5,497,368 A | * | 3/1996 | Reijnierse et al. | 370/351 |
| 5,568,605 A | * | 10/1996 | Clouston et al. | 714/4 |
| 5,646,936 A | * | 7/1997 | Shah et al. | 370/228 |
| 5,649,108 A | * | 7/1997 | Spiegel et al. | 709/241 |
| 5,721,820 A | * | 2/1998 | Abali et al. | 709/243 |
| 5,732,072 A | * | 3/1998 | Thanner et al. | 370/255 |
| 5,854,899 A | * | 12/1998 | Callon et al. | 709/238 |
| 5,884,036 A | * | 3/1999 | Haley | 709/224 |
| 5,926,463 A | * | 7/1999 | Ahearn et al. | 370/254 |
| 6,003,090 A | * | 12/1999 | Puranik et al. | 709/235 |
| 6,069,895 A | * | 5/2000 | Ayandeh | 370/399 |
| 6,246,669 B1 | * | 6/2001 | Chevalier et al. | 370/238 |
| 6,289,096 B1 | * | 9/2001 | Suzuki | 379/221.01 |
| 6,366,584 B1 | * | 4/2002 | Gulliford et al. | 370/403 |
| 6,377,374 B1 | * | 4/2002 | Davis et al. | 398/48 |
| 6,411,946 B1 | * | 6/2002 | Chaudhuri | 706/21 |
| 6,505,254 B1 | * | 1/2003 | Johnson et al. | 709/239 |
| 6,538,991 B1 | * | 3/2003 | Kodialam et al. | 370/229 |
| 6,678,241 B1 | * | 1/2004 | Gai et al. | 370/216 |
| 6,697,338 B1 | * | 2/2004 | Breitbart et al. | 370/254 |
| 2002/0018449 A1 | * | 2/2002 | Ricciulli | 370/268 |
| 2003/0061353 A1 | * | 3/2003 | Johnson et al. | 709/226 |

FOREIGN PATENT DOCUMENTS

| | | |
|---|---|---|
| EP | 926922 A2 * | 6/1999 |
| WO | WO 9821856 A1 * | 5/1998 |
| WO | WO98/24244 * | 6/1998 |
| WO | WO 9953719 A1 * | 10/1999 |

OTHER PUBLICATIONS

"Excerpt from vol. 1—InfiniBand Architecture Specification Release 1.1", *Infiniband Trade Association*, vol. 1—General Specifications,(Nov. 6, 2002),84-100.

"vol. 2—InfiniBand Architecture Specification Release 1.1", *Infiniband Trade Association*, vol. 2—Physical Specifications,(Nov. 6, 2002),1-700.

* cited by examiner

*Primary Examiner*—Paul R. Myers
(74) *Attorney, Agent, or Firm*—Schwegman, Lundberg, Woessner & Kluth, P.A.

(57) ABSTRACT

Clients are able to use a service to obtain detailed path information. The service provides detailed information concerning which links and switches are traversed in a path in a cluster. The service allows clients to make informed decisions about which paths to use when multiple paths are available. The cluster includes a fabric of switches and a plurality of ports. A client makes a request to the service. The request identifies a source and a destination of a path. The service is operative to send a response to the request. The response identifies one or more links and switches between the source and the destination.

22 Claims, 7 Drawing Sheets

SYSTEM AND METHOD FOR PROVIDING DETAILED PATH INFORMATION TO CLIENTS

FIELD

The present invention generally relates to data networks and more particularly relates to a system and method for providing detailed path information to clients.

BACKGROUND

A data network generally includes a network of nodes connected by point-to-point links. Each physical link may support a number of logical point-to-point channels. Each channel may be a bi-directional communication path for allowing commands and message data to flow between two connected nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented I/O services.

Clients connected on a data network may have multiple ports through which to communicate with other clients or applications on the data network. There are often multiple paths between ports and a large number of ports connected to the network. It is not yet possible for a client to know how many switches and links are traversed from a source to a destination in a particular path in a network. There has been no way to provide clients with information that pertains to the links and switches traversed in various paths.

BRIEF DESCRIPTION OF THE DRAWINGS

A more complete appreciation of example embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

Figure 1:
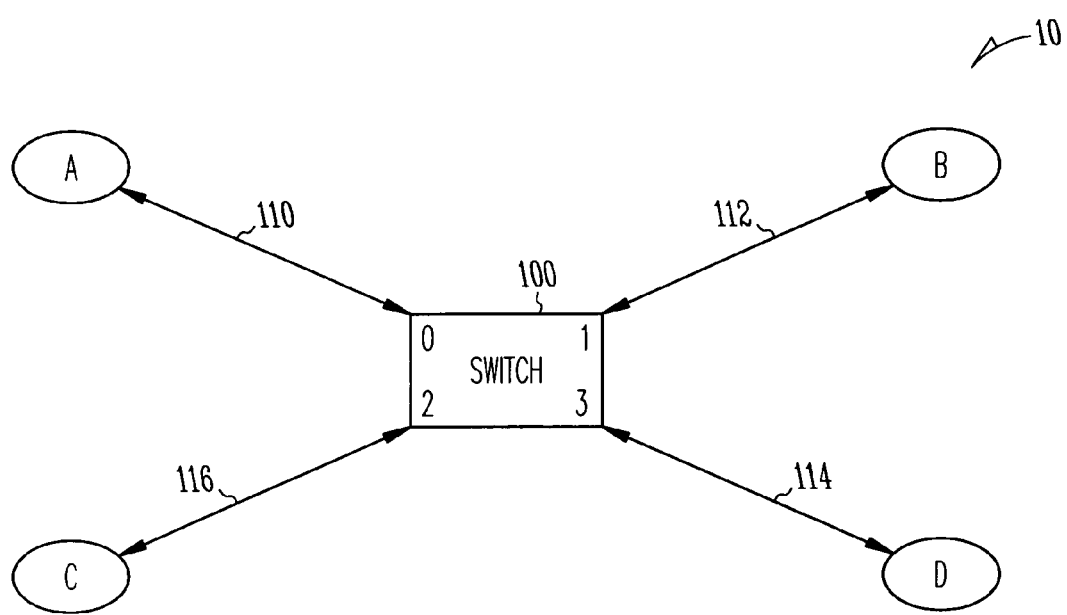
FIG. 1 illustrates an example data network having several nodes interconnected by corresponding links of a basic switch according to an embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same.

Clients are distributed throughout a data network. The clients can have multiple ports through which to communicate with other clients and applications in the data network. There are often a large number of paths between ports and a large number of ports connected to the network. Previously, no service has been able to give detailed information to clients in regard to links and switches traversed in a particular path to a destination. The invention provides detailed information to clients about the links and switches traversed in the available paths from a source to a destination such that clients can make informed decisions about which paths they should use when multiple paths are available.

The present invention is applicable for use with all types of computer networks, I/O hardware adapters and chipsets that allow multiple addresses to be specified to a port, including follow-on chip designs which link together end stations such as computers, servers, peripherals, storage devices, and communication devices for data communications.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. Each I/O unit may include one or more I/O controllers connected thereto. Each I/O controller may operate to control one or more I/O devices, such as storage devices (e.g., a hard disk drive or tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "Next Generation Input/Output (NGIO) Specification" as set forth by the NGIO Forum on Jul. 20, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s).

Figure 2:
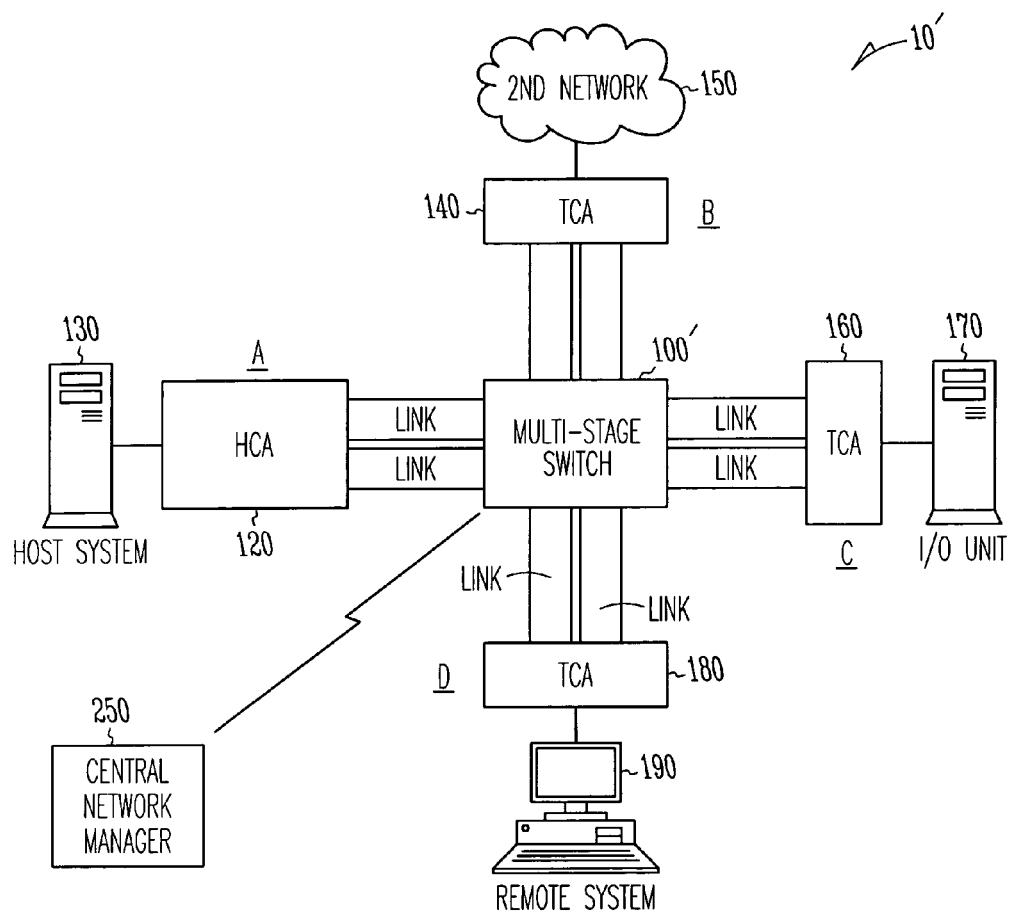
FIG. 2 illustrates another example data network having several nodes interconnected by corresponding links of a multi-stage switched fabric according to an embodiment of the present invention.

For example, FIG. 2 illustrates an example data network 10' using an NGIO architecture to transfer data from a source node to a destination node according to an embodiment of the present invention. As shown in FIG. 2, the data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any ones of target systems. In addition, any number of end stations, switches and links may be used for relaying data in groups of cells between the end stations and switches via corresponding NGIO links.

For example, node A may represent a host system 130 such as a host computer or a host server on which a variety of applications or services are provided. Similarly, node B may represent another network 150, including, but not limited to, local area network (LAN), wide area network (WAN), Ethernet, ATM and fiber channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the multi-stage switched fabric 100' which serve as intermediate nodes between the host system 130 and the remote systems 150, 170 and 190.

The multi-state switched fabric 100' may include a central network manager 250 connected to all the switches for managing all network management functions. However, the central network manager 250 may alternatively be incorporated as part of either the host system 130, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the local system 130 and a multi-stage switched fabric 100' via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 190 and the multi-stage switched fabric 100' via high speed serial NGIO links. Both the host channel adapter (HCA) and the target channel adapter (TCA) may be broadly considered as fabric hardware adapters provided to interface either the host system 130 or any one of the target systems 150, 170 and 190 to the switched fabric, and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO) and/or InfiniBand technologies. FIO specifications have not yet been released, owing to subsequent agreement of NGIO and FIO factions to combine efforts on InfiniBand. InfiniBand information/specifications are presently under development and will be published in a document entitled "InfiniBand Architecture Specification" by the InfiniBand Trade Association (formed Aug. 27, 1999) having the Internet address of "http://www.InfiniBandta.org". The "InfiniBand Architecture Specification" describes features and benefits which are complementary to those provided by NGIO and FIO technologies, and are similarly useful.

Figure 3:
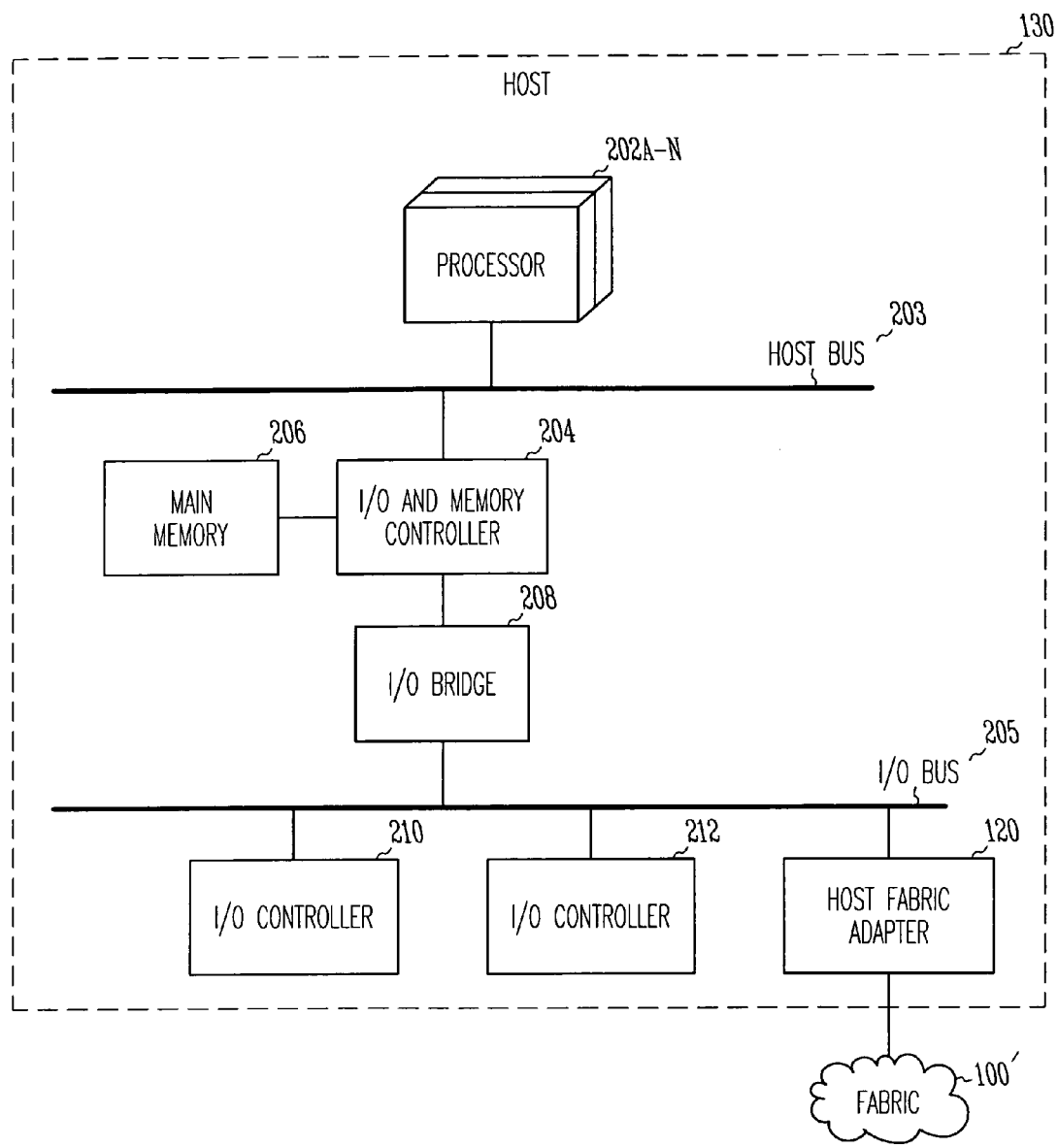
FIG. 3 illustrates a block diagram of a host system of an example data network according to an embodiment of the present invention.

Returning to discussions, one example embodiment of a host system 130 is shown in FIG. 3. Referring to FIG. 3, the host system 130 may correspond to a multi-processor system, including one or more processors 202A–202N coupled to a host bus 203. Each of the multiple processors 202A–202N may operate on a single item (I/O operation), and all of the multiple processors 202A–202N may operate on multiple items (I/O operations) on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to the I/O bus 205, including I/O controllers 210 and 212. I/O controllers 210 and 212 (including any I/O devices connected thereto) may provide bus-based I/O resources.

Figure 4:
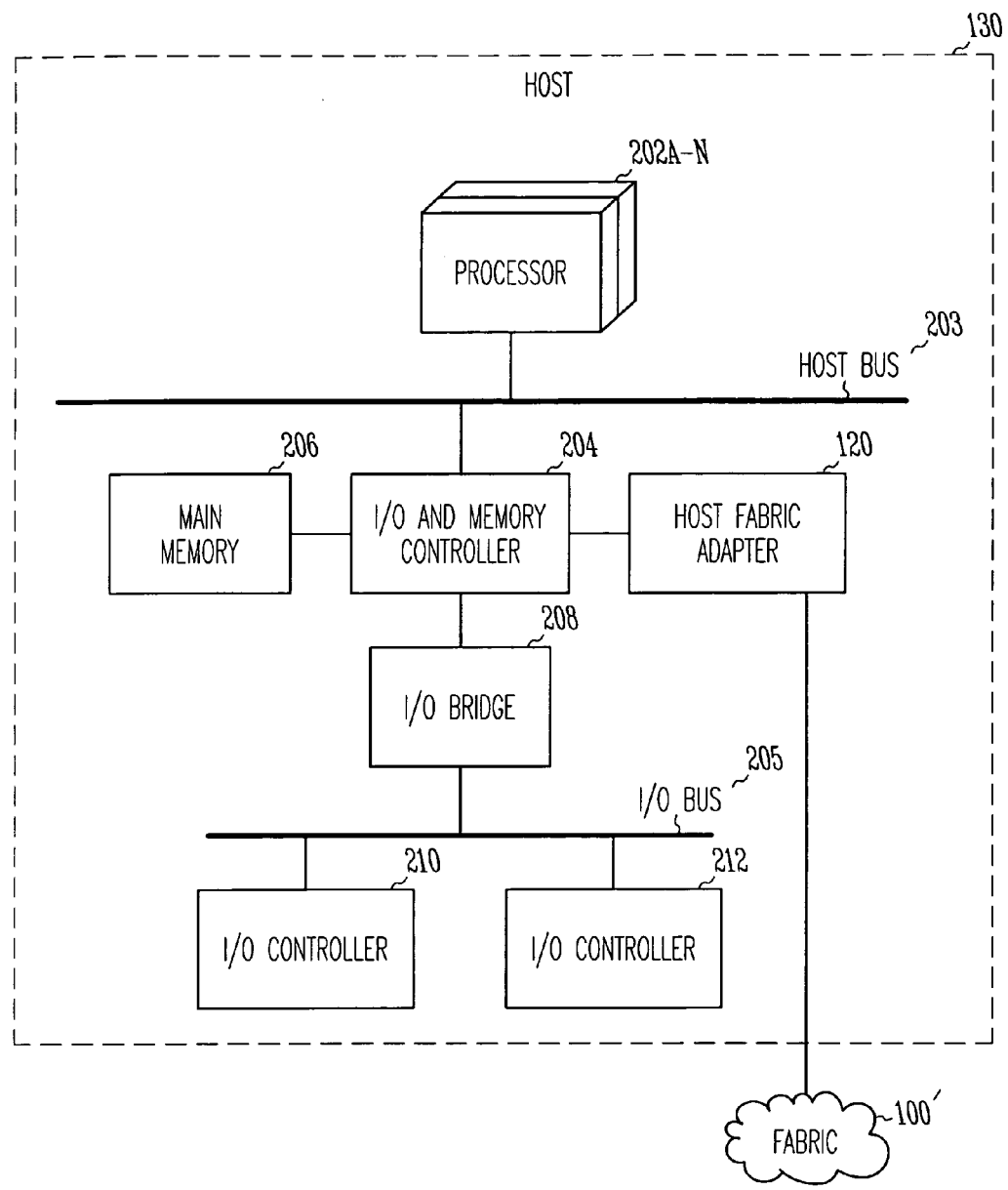
FIG. 4 illustrates a block diagram of a host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment, one or more host-fabric adapters 120 may be provided to interface the host system 130 to the multi-stage switched fabric 100'.

FIGS. 3–4 merely illustrate example embodiments of a host system 130. A wide array of processor configurations of such a host system 130 may be available. Software driver stack for the host-fabric adapter 120 may also be provided to allow the host system 130 to exchange data with one or more remote systems 150, 170 and 190 via the switched fabric 100', while preferably being compatible with many currently available operating systems, such as Windows 2000.

Figure 5:
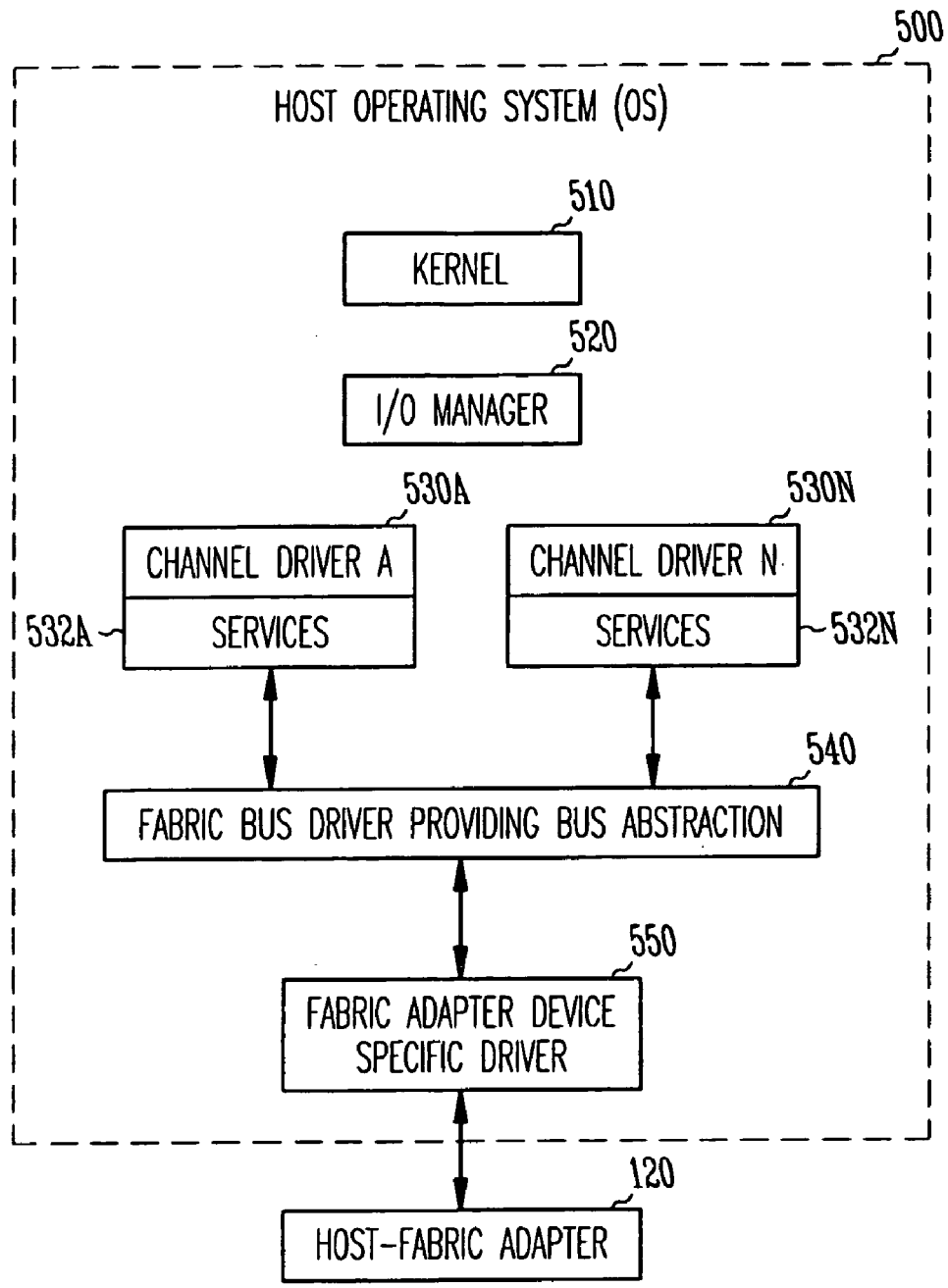
FIG. 5 illustrates an example software driver stack of a host operating system of an example data network according to an embodiment of the present invention.

FIG. 5 illustrates an example software driver stack of a host system 130. As shown in FIG. 5, a host operating system (OS) 500 may include a kernel 510, an I/O manager 520, and a plurality of channel drivers 530A–530N for providing an interface to various I/O controllers. Such a host operating system (OS) 500 may be Windows 2000, for example, and the I/O manager 520 may be a Plug-n-Play manager.

In addition, a host-fabric adapter software stack (driver module) may be provided to access the switched fabric 100' and information about fabric configuration, fabric topology and connection information. Such a host-fabric adapter software stack (driver module) may include a fabric bus driver 540 and a fabric adapter device-specific driver 550 utilized to establish communication with a remote fabric-attached agent (e.g., I/O controller), and perform functions common to most drivers, including, for example, host-fabric adapter initialization and configuration, channel configuration, channel abstraction, resource management, fabric management service and operations, send/receive I/O transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "Next Generation I/O Architecture: Host Channel Adapter Software Specification." For example, the HCA service layer (HSL) may be inherent to all channel drivers 530A–530N for providing a set of common fabric services in a service library, including connection services, resource services, and HCA services required by the channel drivers 530A–530N to instantiate and use NGIO channels for performing data transfers over the NGIO channels.

The host system 130 may also communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI architecture may contain work queues formed in pairs including a send queue and a receive queue in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures such as InfiniBand may also be used to implement the present invention.

In such a data network, NGIO, VI and InfiniBand hardware and software may be used to support asynchronous data transfers between two memory regions, often on different systems. Each system may serve as a source (initiator) system which initiates a message data transfer (message send operation) or a target system of a message passing operation (message receive operation). Each system may correspond to a multi-processor system including multiple processors each capable of processing an I/O completion on a different shared resource (such as work queues or other memory elements associated with a given hardware adapter). Examples of such a multi-processor system may include host servers providing a variety of applications or services, and I/O units providing storage-oriented and network-oriented I/O services.

The InfiniBand architecture specification defines a common base for connecting hosts and I/O enclosures together in a cluster for improved performance. A cluster that conforms to the InfiniBand architecture specification allows hardware and software solutions from different vendors to inter-operate, and is often referred to as a "subnet". Moreover, a cluster may include one or more subnets.

A group of hosts and I/O enclosures in an InfiniBand cluster is managed by a subnet manager. One of the hosts can be designated the subnet manager. Each host system or I/O enclosure is connected to the interconnection fabric through a channel adapter. A channel adapter may have one or more connection points called ports.

The subnet manager assigns each port at least one unique address denoted a "local identification value" (LID). The subnet manager operates to discover fabric topology, assign unique addresses to all channel adapter ports that are connected to the fabric, program switch forwarding tables, and prepare all fabric connected agents so that they can communicate with other fabric agents, in addition to performing other tasks.

According to the InfiniBand architecture specification, multiple LIDs can be assigned to each port. Each LID assigned to a port represents a unique path to this port from some other port on the cluster (or subnet). A client that wants to use multiple paths to a remote client can use different LIDs to specify different paths to its destination through the fabric. This allows a client to perform load balancing, obtain better throughput, and recover from the failure of one path if some alternate path is still functional.

To enable multi-pathing, the subnet manager identifies all possible paths to a port from any other port on the fabric, and then assigns enough LIDs to the port such that different paths to this port can be identified by a different LID. If multiple paths exist between two ports, clients on each port can explicitly choose which path will be used based on the LIDs used to communicate between the two ports. Multiple paths will exist if the subnet contains multiple (redundant) links that connect switches or channel adapters together.

In today's high-performance computing environment, clusters are becoming more popular because of the better properties they exhibit compared to individual high-performance servers and workstations. A cluster includes one or more host nodes and zero or more I/O enclosures connected together by a (typically high-speed) interconnection fabric. Clusters are typically based on a unifying technology that makes it easier to plug in solutions from different vendors. Examples of such technologies are InfiniBand and Fiber Channel.

Some of the important benefits of clustering based on InfiniBand technology are the ability to support high bandwidth, virtually unlimited scalability, and good fault isolation characteristics. A client, such as a host or an I/O enclosure, that is aware that it is running on an InfiniBand cluster can take advantage of multiple paths between that client and another client with which it is trying to communicate. For example, a pair of InfiniBand clients might decide to use a primary path for communication and fail-over to an alternate path if the primary path fails. Fail-over is the process of using a new path between a pair of fabric attached agents/clients when an existing path breaks. Clients at both ends of the path need to fail over to the new path. Another pair of InfiniBand clients might want to simultaneously use multiple paths for higher throughput or load balancing.

Figure 6:
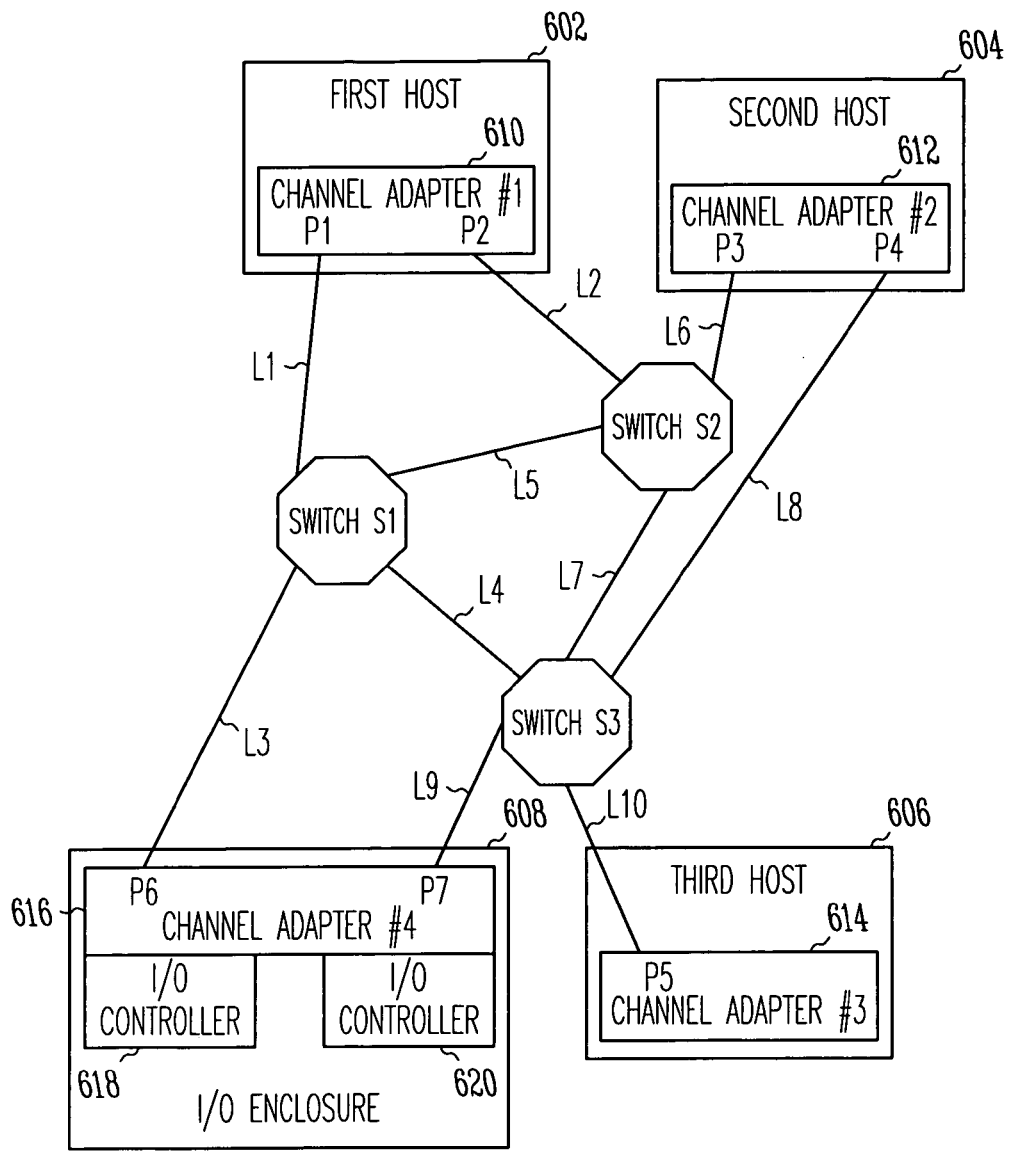
FIG. 6 illustrates an example cluster according to an embodiment of the present invention.

FIG. 6 shows an example cluster (i.e., a subnet) in which multiple paths exists between various clients. The cluster shown in FIG. 6 includes three interconnected switches, a first switch S1, a second switch S2, and a third switch S3. The cluster includes a first host 602, a second host 604, and a third host 606. The second host 604 serves as the subnet manager in the example cluster shown in FIG. 6. The cluster includes an I/O enclosure 608.

In the example, the first host 602 includes a first channel adapter 610. The first channel adapter 610 presents a first port P1 and a second port P2. The second host 604 includes a second channel adapter 612. The second channel adapter 612 presents a third port P3 and a fourth port P4. The third host 606 includes a third channel adapter 614. The third channel adapter 614 presents a fifth port P5. The I/O enclosure 608 includes a fourth channel adapter 616. A first I/O controller 618 and a second I/O controller 620 are coupled to the fourth channel adapter 616. The fourth channel adapter 616 presents a sixth port P6 and a seventh port P7.

A set of links provides a communicative capability for the cluster shown in FIG. 6. A first link L1 connects the first port P1 and the first switch S1. A second link L2 connects the second port P2 and the second switch S2. A third link L3 connects the sixth port P6 and the first switch S1. A fourth link L4 connects the first switch S1 and the third switch S3. A fifth link L5 connects the first switch S1 and the second switch S2. A sixth link L6 connects the second switch S2 and the third port P3. A seventh link L7 connects the second switch S2 and the third switch S3. An eighth link L8 connects the third switch S3 and the fourth port P4. A ninth link L9 connects the third switch S3 and the seventh port P7. A tenth link L10 connects the third switch S3 and the fifth port P5.

In the example cluster depicted in FIG. 6, the ports are numbered from P1 to P7, the switches are numbered from S1 to S3, and the links are numbered from L1 to L10. The physical topology of the subnet is such that the following paths are available to an InfiniBand client running on the first host 602 that wants to communicate with an InfiniBand client running on the second host 604:

Path One: from port P2 to link L2 to switch S2 to link L6 to port P3. This path traverses two links and one switch.

Path Two: from port P2 to link L2 to switch S2 to link L7 to switch S3 to link L8 to port P4. This path traverses three links and two switches.

Path Three: from port P1 to link L1 to switch S1 to link L5 to switch S2 to link L6 to port P3. This path traverses three links and two switches.

Path Four: from port P1 to link L1 to switch S1 to link L4 to switch S3 to link L8 to port P4. This path traverses three links and two switches.

Path Five: from port P2 to link L2 to switch S2 to link L5 to switch S1 to link L4 to switch S3 to link L8 to port P4. This path traverses four links and three switches.

Path Six: from port P1 to link L1 to switch S1 to link L4 to switch S3 to link L7 to switch S2 to link L6 to port P3. This path traverses four links and three switches.

Path Seven: from port P1 to link L1 to switch S1 to link L5 to switch S2 to link L7 to switch S3 to link L8 to port P4. This path traverses four links and three switches.

Even in a small subnet, several paths may be available between a pair of clients. The quality of the available paths can vary widely. The metric that is used to evaluate the quality of a path can be different based on the reason why the path is being used.

For example, if multiple paths are being used for fail-over, an important metric that determines the quality of the available paths is whether the paths traverse common links or switches. If the primary and alternate paths traverse a large number of common switches or links, a failure in one of those switches or links will break not just the primary path but also the alternate path. As the link/switch overlap between the primary and alternate path increases, the probability that both paths will fail simultaneously increases. For fail-over, a client pair may want to use paths that have as few overlapping switches and links as the physical topology allows, even though these paths do not have the best path-latency or hop-count properties. The InfiniBand architecture specification does not define or provide mechanisms for reporting such detailed path information to interested clients.

In the example cluster illustrated in FIG. 6, only Path One and Path Four have no common link or switch. All other path-pairs share at least one common link or switch. For this reason, a client running on the first host 602 would want to chose Path One as the primary path and Path Four as the alternate path for fail-over in order to communicate with an InfiniBand client running on the second host 604.

The only way it can make this informed decision is if it has detailed information about these paths. The hop count value is not sufficient to make this decision since the hop count is the same for Path Two, Path Three, and Path Four (two switches and three links traversed). In the absence of detailed path information, a client may be forced to blindly cycle through multiple available paths until the client encounters a functional alternate path when the primary path fails. This may consume a large amount of time.

The situation is made worse by the fact that unreliable InfiniBand datagrams may be used to verify the availability and to set up a connection using the alternate path when the primary path fails. An InfiniBand datagram is a fixed-size message that is used to communicate between fabric-attached end points. A Queue Pair (QP) that is configured for sending or receiving datagram messages can simultaneously send and receive from multiple InfiniBand end points.

The InfiniBand client failing over may have to wait for a large time-out period before such client can decide whether an alternate path it is trying to use is also broken or just temporarily unavailable for some other reason. This makes it very difficult to implement fail-over since the extended delays in failing over to a functional path may trigger timeouts in the consumers of the InfiniBand services.

For example, if a host-side I/O controller driver for a fabric-attached SCSI adapter wants to use multiple paths for fail-over, it must fail-over to a new path within a few seconds when the primary path fails. If it is unable to do so, the upper-level SCSI drivers will time out and attempt to reset the SCSI bus.

The need for detailed path information also exists for a client pair that wants to use multiple paths to facilitate load distribution or higher throughput. Such client pair might want to balance the importance the client pair provides to other path properties (like link speed, service levels supported, path latency, and hop count) versus the number of overlapping switches or links. Even though there may not be a single correct answer in regard to the available paths to use, clients ought to be given enough detailed information about the available paths so that they can make an informed decision that is appropriate for them.

The InfiniBand architecture specification defines a path record that provides some properties of a path. Properties reported in the path record include the hop count, the service levels supported, the maximum transfer unit (MTU), link speed and latency cost of the path. There is, however, no capability of providing detailed link or switch traversal information to interested clients and no mechanisms are provided to query or report this information.

The invention provides a procedure that can be used by interested InfiniBand clients to obtain detailed path-composition information, which allows clients to make informed decisions about which paths should be used to best suit their purposes. According to the invention, an InfiniBand subnet has a service provider that provides detailed information about which links and switches are traversed in a path. This allows clients to make informed decisions about which paths to use when multiple paths are available. Two separate ways in which such a service can be implemented are described as follows.

First, the detailed path information service can be implemented as a service agent sitting on top of the General Service Interface (GSI). The General Service Interface (GSI) is an interface providing management services (e.g., connection, performance, and diagnostics) other than subnet management. Queue Pair 1 (QP1) is reserved for the GSI, which may redirect requests to other Queue Pairs (QPs).

Queries and responses to and from this service are sent using management datagrams (MADs) sent on queue pair 1. A Management Datagram (MAD) refers to the contents of an unreliable datagram packet used for communication among the HCAs, switches, routers, and TCAs to manage the network. The InfiniBand architecture specification describes the format of a number of these management commands.

The service that provides detailed path information registers with the GSI as a service agent. One option is that this service agent is implemented by the subnet administration code that also responds to the SubnAdm class of MADs. This is a natural fit since the subnet administrator is also responsible for providing other path information (like path latency, hop count, service classes supported, the maximum transfer unit and path speed) as described in the InfiniBand architecture specification. Since the MAD format for querying and reporting detailed path information is not defined in the InfiniBand architecture specification, vendor-specific MADs can be used for this purpose.

The general header format of a vendor-specific MAD is defined in the InfiniBand architecture specification. To issue the path information query, a client would send a message with class value set to VendorSpecific; method value set to VendorSpecificGet or VendorSpecificGetTable; and attribute value set to DetailedPathInfo. This message would be sent to the subnet administrator address. If the service resides at a different local identification value (LID) or queue pair, the client can be redirected using the ClassPortInfo message specified in the InfiniBand architecture specification. As input, the client would supply relevant information like the LID or Global Identifier (GID) of the source and destination. A GID is a 128-bit identifier used to identify a port on a channel adapter, a port on a router, or a multicast group. A GID is a valid 128-bit IPv6 address (per RFC 2373) with additional properties or p restrictions defined within the InfiniBand architecture specification to facilitate efficient discovery, communication, and routing.

Different implementations can also take the node GUID (Globally Unique Identifier) or platform GUID of the source and destination as input. A GUID is a software-readable number that uniquely identifies a device or component. As output of this query, the subnet administrator provides the port and node GUIDs of all switches that are traversed in this path. The width and layout of the input and output fields in the MAD are specified and documented by whoever implements the service. Note that links themselves do not have any identification or visibility and cannot be directly listed in the path information. However, the port GUIDs of the switch ports listed in the path information will uniquely identify the links being traversed. The switch port GUIDs and node GUIDs are listed in the order they are traversed from the source to the destination. For some queries, multiple packets may be needed to report the results. In this case, the mechanisms that are used to send multi-packet responses for other SubrAdm messages can be used here also.

The advantage of the foregoing arrangement is that the infrastructure in place to query and report other path properties can be used with only minor modifications to query and report detailed path information. Redirection to a different LID or queue pair can be accomplished using the infrastructure already put in place to redirect other service classes.

Figure 7:
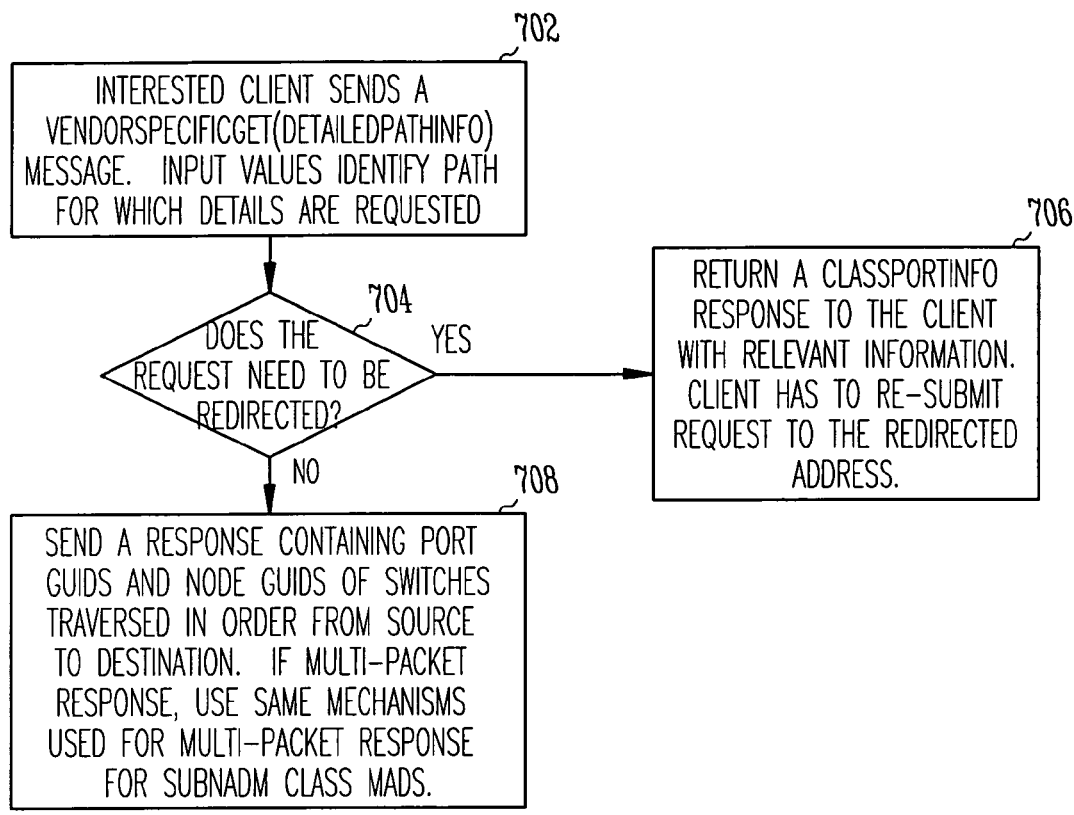
FIG. 7 is a process flow diagram for describing providing detailed path information to clients according to an embodiment of the present invention.

FIG. 7 illustrates a path service implemented as a vendor-specific service over the GSI and the process performed by the path service agent. Regarding FIG. 7, in block 702, an interested client sends a VendorSpecificGet(DetailedPathInfo) message to the service, where the input values in the message identify the path for which details are requested. In block 704, the service determines whether the request needs to be redirected. If yes, in block 706, the service returns a ClassPortInfo response to the client with relevant information, by which the client is instructed to submit the request to the redirected address. If no, the request does not need to be redirected, in block 708, the service sends a response containing the port GUIDs and node GUIDs of the one or more switches traversed in the path, in sequential order from source to destination. For a multi-packet response, the service uses the same mechanism for the multi-packet response as for the SubnAdm class MADs.

Second, the detailed path information service can also be implemented as a service that uses regular (i.e. non-MAD)

unreliable datagrams to communicate with clients. Clients use the service ID resolution protocol defined in the Infini-Band architecture specification to communicate with this service. A client wishing to query this service first needs to query a service locator that provides the address (LID) where the service resides. The client then sends a service ID resolution request (SIDR_REQ) message to this address. As a response, the client receives a service ID resolution response (SIDR_REP) message that provided other information (like queue pair and Q-Key) needed to be able to communicate with this service. Once the client has all the information needed to communicate with the path service, the client sends a query to the service. As input, the client supplies relevant information like the LID or GID of the source and destination.

Different implementations can also take the node GUID or platform GUID of the source and destination as input. As output of this query, the detailed path information service provides the port GUIDs and node GUIDs of all switches that are traversed in this path. The format and layout of the input and output fields in the message are specified and documented by whoever implements the path service. The switch port GUIDs and node GUIDs are listed in the order they are traversed from the source to the destination.

For some queries, multiple packets may be needed to report the results. In this case, the service implementation defines the mechanisms that are used to send multi-packet responses. The advantage of this implementation is that a vendor-specific MAD is not needed for communication. This can be an important issue since the InfiniBand architecture specification allows only one type of vendor-specific MAD to be used in a subnet. If two separate vendors want to use vendor specific MADs in the same subnet, they cannot do that without explicitly cooperating with each other.

The ability to use multiple paths to the same destination is an important benefit of clusters over traditional bus-based systems. The invention makes available information that is valuable to intelligent clients that want to benefit from multiple paths to their destination. Such clients can make an informed decision about which of the several available paths they should use based on this detailed path information.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. For example, the present invention is applicable to all types of data networks that allow multiple addresses to be assigned to ports, including, but not limited to, a local area network (LAN), a wide area network (WAN), a campus area network (CAN), a metropolitan area network (MAN), a global area network (GAN) and a system area network (SAN). Further, many other modifications may be made to adapt the teachings herein to a particular situation without departing from the scope thereof. Therefore, it is intended that the present invention not be limited to the various example embodiments disclosed, but that the present invention includes all embodiments falling within the scope of the appended claims.

What is claimed is:

1. A method, comprising:
performing a topology discovery of properties of fundamental path elements of a cluster, including path links, the topological discovery being performed without modification of the path elements;
receiving a request from a client for information on the properties of the fundamental path elements of a path, the request identifying at least a source and a destination of the path;
identifying links and switches traversed in the path to identify all fundamental path elements of the path;
identifying at least one alternative path to the path if an alternative path exists, wherein the alternative path has as few overlapping switches and links with the path as the physical topology allows;
obtaining respective detailed information on properties of each of the fundamental path elements, including detailed information on properties of the fundamental path elements of the at least one alternative path; and
sending a response to the client based on the request, the response providing the information on the properties for the fundamental path elements of the path and the at least one alternative path, including one or more links between the source and the destination.

2. The method of claim 1, further comprising:
determining whether the request ought to be redirected.

3. The method of claim 2, further comprising:
sending a redirection address to the client if the request ought to be redirected.

4. The method of claim 3, further comprising:
submitting the request to the redirection address.

5. The method of claim 1, wherein the properties of fundamental path elements include at least one of: link speed, service levels supported, path latency, hop count, maximum transfer unit (MTU), and latency cost.

6. The method of claim 1 wherein identification of fundamental path elements is performed using at least one of the following:
the source and the destination are each identified by a respective local identification value (LID), each switch is identified by a respective globally unique identifier (GUID), and each link is identified by at least the port GUIDs of ports connected to both ends of the link.

7. The method of claim 1, wherein:
the response identifies an order in which the one or more links are traversed from the source to the destination.

8. A cluster, comprising:
a fabric of switches and path links;
a topographical discovery service coupled to the fabric, the service operative to discover properties of fundamental path elements of the fabric without modification of the path elements, including the path links, including identification of links and switches traversed in a path and in at least one alternative path, if one exists, wherein the at least one alternative path has as few overlapping switches and links with the path as the physical topology allows, the discovery to include identify all fundamental path elements of the path and the at least one alternative path if one exists, and including respective detailed information on properties of each of the fundamental path elements; and
wherein the service is operative to send a response based on a request from a client for information on the properties of the fundamental path elements of the path and the at least one alternative path if one exists;
wherein the request identifies at least a source and a destination of a path; and
wherein the response providing the information on the properties for the fundamental path elements of the path and the at least one alternative path if one exists, including one or more links between the source and the destination.

9. The cluster of claim 8, wherein:
the client is one of a host and an I/O enclosure.

10. The cluster of claim 8, wherein the properties of fundamental path elements include at least one of: link speed, service levels supported, path latency, hop count, maximum transfer unit (MTU), and latency cost.

11. The cluster of claim 8, wherein:
the service is operative to determine whether the request ought to be redirected.

12. The cluster of claim 11, wherein:
if the request ought to be redirected, the service is operative to send a redirection address to the client, and the request is submitted to the redirection address.

13. The cluster of claim 8, wherein identification of fundamental path elements is performed using at least one of the following:
the source and the destination are each identified by a respective local identification value (LID), each switch is identified by a respective globally unique identifier (GUID), and each link is identified by at least the port GUIDs of ports connected to both ends of the link.

14. The cluster of claim 8, wherein:
the response identifies an order in which one or more links are traversed from the source to the destination.

15. The cluster of claim 8, wherein:
the topographical discovery service is operative to discover properties of all fundamental path elements of the fabric.

16. A computer readable medium having stored thereon instructions which, when executed, enables a system to perform a method, said method comprising:
performing a topology discovery of properties of fundamental path elements of a cluster, including path links, the topological discovery being performed without modification of the path elements;
receiving a request from a client for information on the properties of the fundamental path elements of a path, the request identifying at least a source and a destination of the path;
identifying links and switches traversed in the path to identify all fundamental path elements of the path;
identifying at least one alternative path to the path, wherein the alternative path has as few overlapping switches and links with the path as the physical topology allows;
obtaining respective detailed information on properties of each of the fundamental path elements, including detailed information on properties of the fundamental path elements of the at least one alternative path; and
sending a response to the client based on the request, the response providing the information on the properties for the fundamental path elements of the path and the at least one alternative path, including one or more links between the source and the destination.

17. The computer readable medium of claim 16, said method further comprising:
determining whether the request ought to be redirected.

18. The computer readable medium of claim 17, said method further comprising:
sending a redirection address to the client if the request ought to be redirected.

19. The computer readable medium of claim 18, said method further comprising:
submitting the request to the redirection address.

20. The computer readable medium of claim 16, wherein the properties of fundamental path elements include at least one of: link speed, service levels supported, path latency, hop count, maximum transfer unit (MTU), and latency cost.

21. The computer readable medium of claim 16, wherein identification of fundamental path elements is performed using at least one of the following:
the source and the destination are each identified by a respective local identification value (LID), each switch is identified by a respective globally unique identifier (GUID), and each link is identified by at least the port GUIDs of ports connected to both ends of the link.

22. The computer readable medium of claim 16, wherein:
the response identifies an order in which one or more links are traversed from the source to the destination.

* * * * *